United States Patent [19]
Groves

[11] Patent Number: 4,887,646
[45] Date of Patent: Dec. 19, 1989

[54] TEST FITTING

[75] Inventor: Oliver J. Groves, County of King, Wash.

[73] Assignee: The Boeing Company, Seattle, Wash.

[21] Appl. No.: 157,901

[22] Filed: Feb. 18, 1988

[51] Int. Cl.⁴ ......................... F16L 55/10; G01M 3/28
[52] U.S. Cl. ......................................... 138/90; 138/89; 138/96 R; 73/49.5; 73/49.8
[58] Field of Search ............... 138/89, 90, 96 R, 96 T; 73/49.5, 49.8

[56] References Cited

U.S. PATENT DOCUMENTS

| | | |
|---|---|---|
| Re. 31,993 | 10/1985 | Wesch, Jr. . |
| 1,033,397 | 7/1912 | Hauquitz . |
| 1,116,845 | 11/1914 | Rogers . |
| 2,155,602 | 4/1939 | Keulers .................................. 138/90 |
| 2,445,876 | 7/1948 | Fullerton ............................ 73/49.5 |
| 2,886,067 | 5/1959 | Maxwell et al. ....................... 138/90 |
| 2,902,297 | 9/1959 | Cowan . |
| 3,331,238 | 7/1967 | Kost et al. ............................ 73/49.5 |
| 3,434,337 | 3/1969 | Goeke . |
| 3,803,901 | 4/1974 | McConnell et al. . |
| 4,050,720 | 9/1977 | Reneau . |
| 4,077,250 | 3/1978 | Wesch . |
| 4,127,026 | 11/1978 | Battafarano .......................... 73/49.5 |
| 4,276,771 | 7/1981 | Wesch Jr. . |
| 4,284,298 | 8/1981 | Kaufmann, Jr. . |
| 4,381,800 | 5/1983 | Leslie . |
| 4,385,643 | 5/1983 | Noe . |
| 4,474,216 | 10/1984 | Noe . |
| 4,625,765 | 12/1986 | O'Donnell et al. . |
| 4,753,108 | 6/1988 | Jönsch .................................. 73/49.8 |

OTHER PUBLICATIONS

Model 64 Hydraulic Tool, Model 30 Hydraulic Tool, Model 33 Hydraulic Tool, Model 22 Hydraulic Tool, Model 170 Series Hydraulic Tools, AIR-Mo Hydraulics Inc.

Primary Examiner—James E. Bryant, III
Attorney, Agent, or Firm—Seed and Berry

[57] ABSTRACT

A high pressure fitting for placing on a tubing includes an annular sleeve having sealing rings therein and a collar enclosing a portion of the sleeve to restrain lateral movements of the sleeve with respect to the tubing. The sleeve has an interior threaded region to receive a plug and an interior annular region. A recess in the annular region retains an O ring and two backup rings which contact the tubing. The sleeve does not contact the tubing. The collar includes two members that have a flange extending into a recess of the exterior of the sleeve to retain the sleeve. The collar also includes an interior tapered annular region spaced away from the end of the tubing for retaining tapered sleeves. The tapered sleeves grip the tubing to prevent movement of the collar and the sleeve with respect to the tubing when high fluid pressure is in the tubing. A tube guide having a shoulder abutting the end of the tubing aids in placing the sleeve on the tubing. The tube guide has a diameter at the shoulder, equal to or slightly greater than, the external diameter of the tubing. The tube guide is placed in the tubing and the sleeve is slid over the tube guide and onto the tubing after which the tube guide is removed.

10 Claims, 7 Drawing Sheets

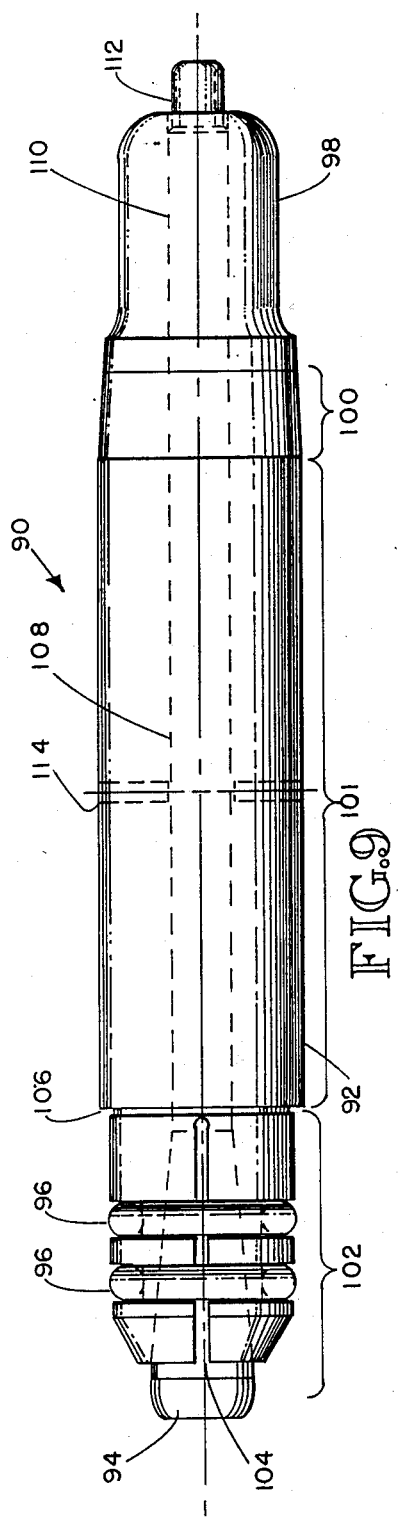
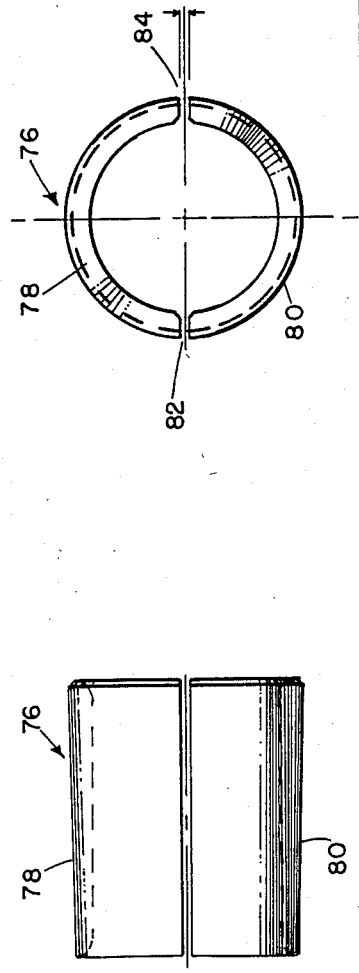

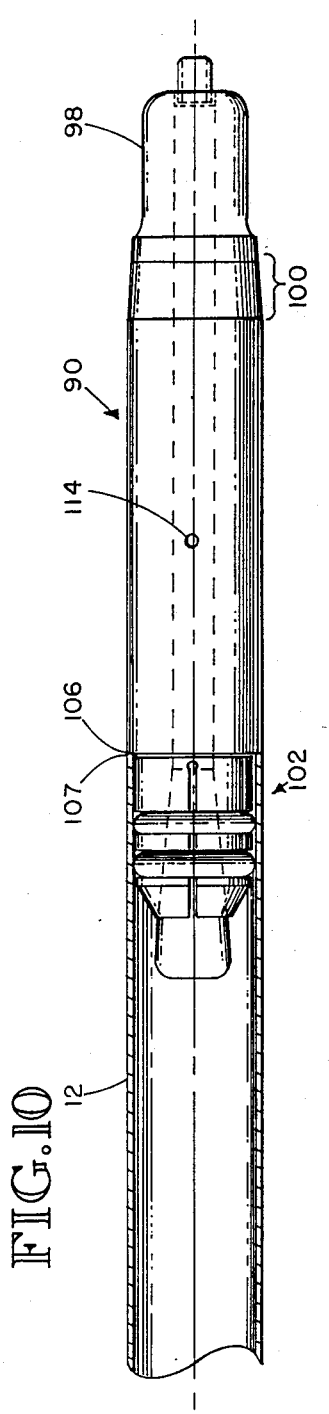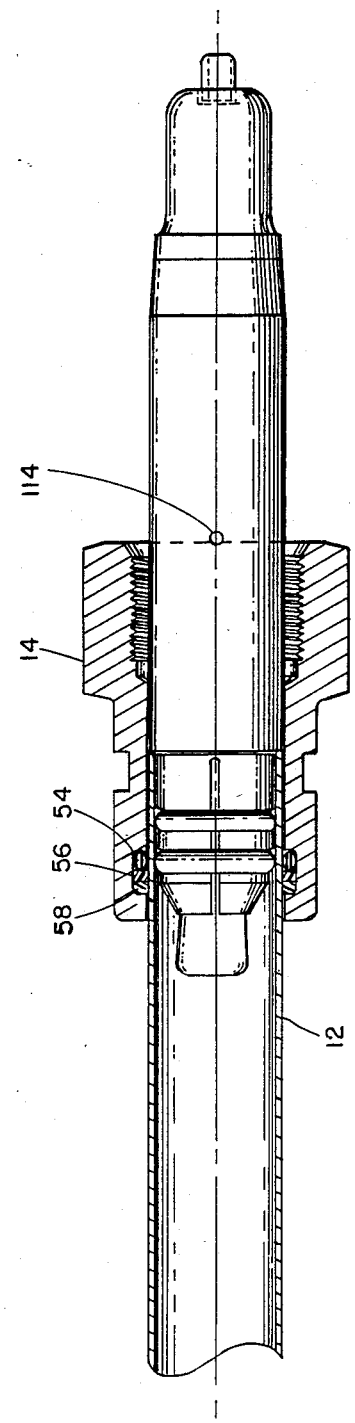

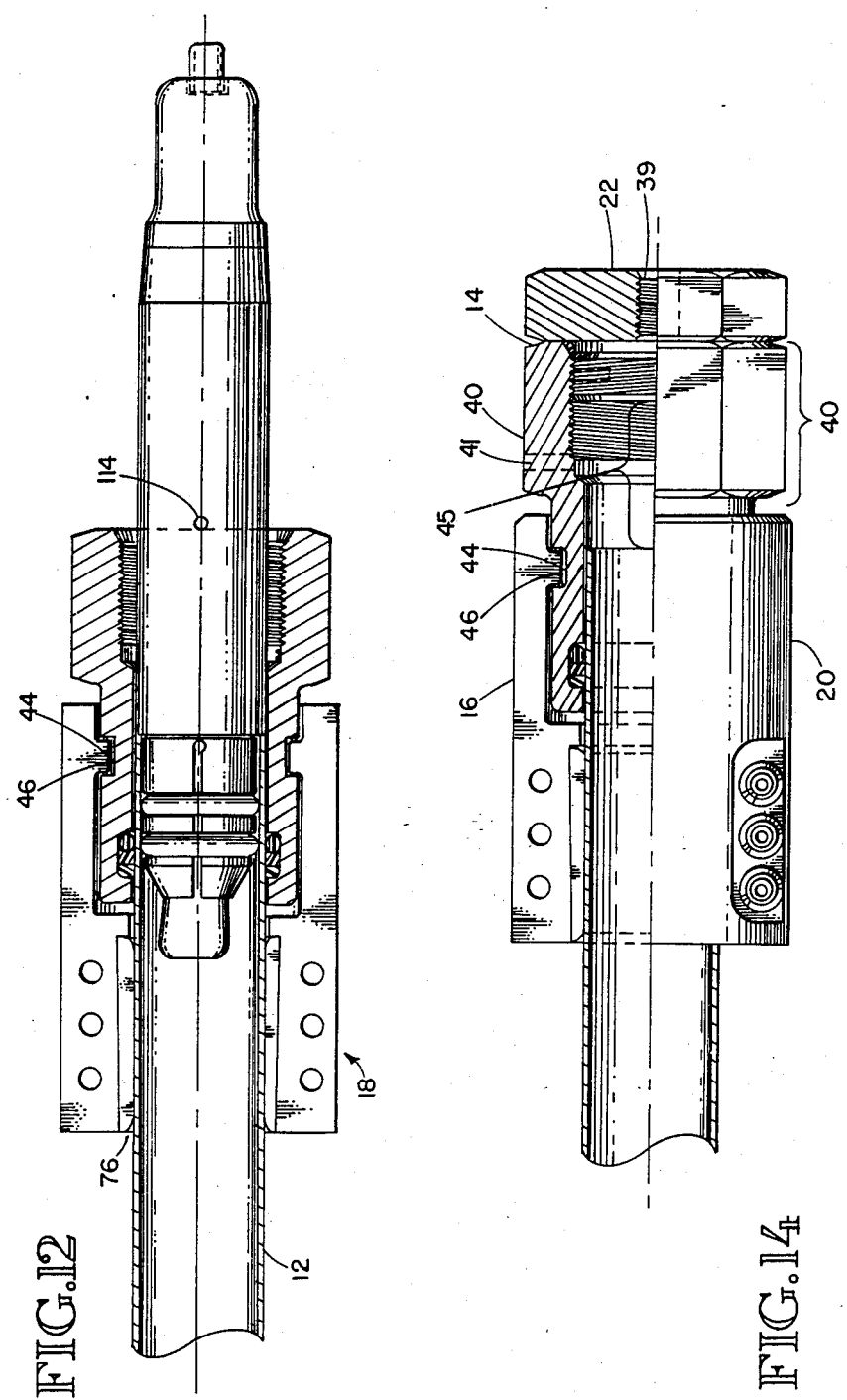

TEST FITTING

STATEMENT OF GOVERNMENT INTEREST

The U.S. Government has certain rights in this invention.

TECHNICAL FIELD

This invention relates to fittings for bare tubing and more particularly, to a tube guide and high pressure fitting and a method of placing the fitting on the tubing.

BACKGROUND ART

Titanium alloy tubing is frequently used in hydraulic systems, such as on an aircraft, to hold fluid or carry fluid to various locations within the hydraulic system. The fluid in the tubing is often under high pressure. The tubing must be properly tested to 1½ or 2 times the working pressure prior to use to insure that it will not rupture or fail during use. It is also important that the tubing not be damaged by the test equipment and that impurities not be permitted to enter the tubing during the test.

Autofrettage is frequently carried out on titanium tubing by subjecting the tubing to a high internal pressure that stresses the inner part into the plastic range and, when removed, leaves residual compression there and residual tension in the outer part. The autofrettage is carried out by placing fluid inside the tubing under very high pressure, not to exceed 85% yield. This pressure is often greater than the working pressure and is in the range of 11,000 to 16,000 psi for titanium alloy tubing.

All open ends of the tubing must be capped or plugged during the testing or autofrettage process. This is often difficult because the ends are frequently bare tubing without any fittings or threaded connections thereon. If the tubing to be tested is in place in an aircraft hydraulic system, the tubing must be restored to full working conditions after the test. The tubing is often connected by an industry standard cryofit that uses the bare, square, ends of the tubing to connect the tubing within the system. Present test fittings often damage or mar the inside or outside of the bare tubing making it unfit for further use. Removal of the damaged section by cutting the end off the tubing creates extra expense. Further, for hydraulic systems in place on aircraft, the end of the tubing may not be cut off. A fitting is needed that can be placed over the bare end of a tube to plug the end when fluid under high pressure is placed in the tubing.

DISCLOSURE OF INVENTION

It is an object of this invention to provide a fitting for placement on the bare end of tubing that can withstand higher pressures than previously attainable without damage to the end of the tubing.

It is another object of this invention to provide a method of placing the fitting on the tubing without causing damage to the fitting or to seals inside the fitting.

It is another object of this invention to provide a guide to be placed inside the tube and extending outside of the tube to aid in placing the fitting onto the tubing.

These and other objects are accomplished by providing an annular sleeve having interior sealing rings in contact with the tubing. The sleeve is held in place by a collar. The method of placing the fitting onto the tubing is to insert a tube guide assembly inside the tube prior to placing the fitting over the tubing. A portion of the tube guide extends out of the tube. The external end of the tube guide is tapered so the sleeve may be easily slid along the tube guide. The fitting is slid from the tube guide onto the tubing. Alignment marks are provided on the tube guide to indicate when the sleeve is properly positioned on the tubing. The tube guide is removed from the tubing prior to placing fluid therein.

A collar is placed around the sleeve to hold it in position on the tubing. The sleeve has an annular recess for receiving a retaining flange from the collar. The collar includes two members that are held together by fasteners. Tapered slip sleeves fit between the collar and the tube to hold the collar and sleeve firmly in place on the tube when fluid under pressure is in the tube. The tapered sleeves transfer the shear force acting on the collar and sleeve at least partially into a tension force acting on the fasteners, and thus a compression force acting on the sleeves. When the test is completed, the fitting is removed from the tubing and no marks, galling or damage have been caused by the fitting due to the test. No impurities are placed into the system by the tube guide or fitting.

BRIEF DESCRIPTION OF DRAWINGS

FIG. 7 is an end view of the tapered slip sleeves.

FIG. 8 is a side elevation of the tapered sleeve.

FIG. 9 is a side elevation of the tube guide assembly.

FIG. 10 is a partial cross-sectional view of the tube guide assembly placed in the tubing.

FIG. 11 is a partial cross-sectional view of the sleeve and tube guide placed on the tubing.

FIG. 12 is a partial cross-sectional view of the collar, slip sleeve set, sleeve and tube guide placed on the tubing.

FIG. 14 is a partial cross-sectional view of the sleeve, end plug and collar placed on the tubing.

BEST MODE FOR CARRYING OUT THE INVENTION

Figure 1:
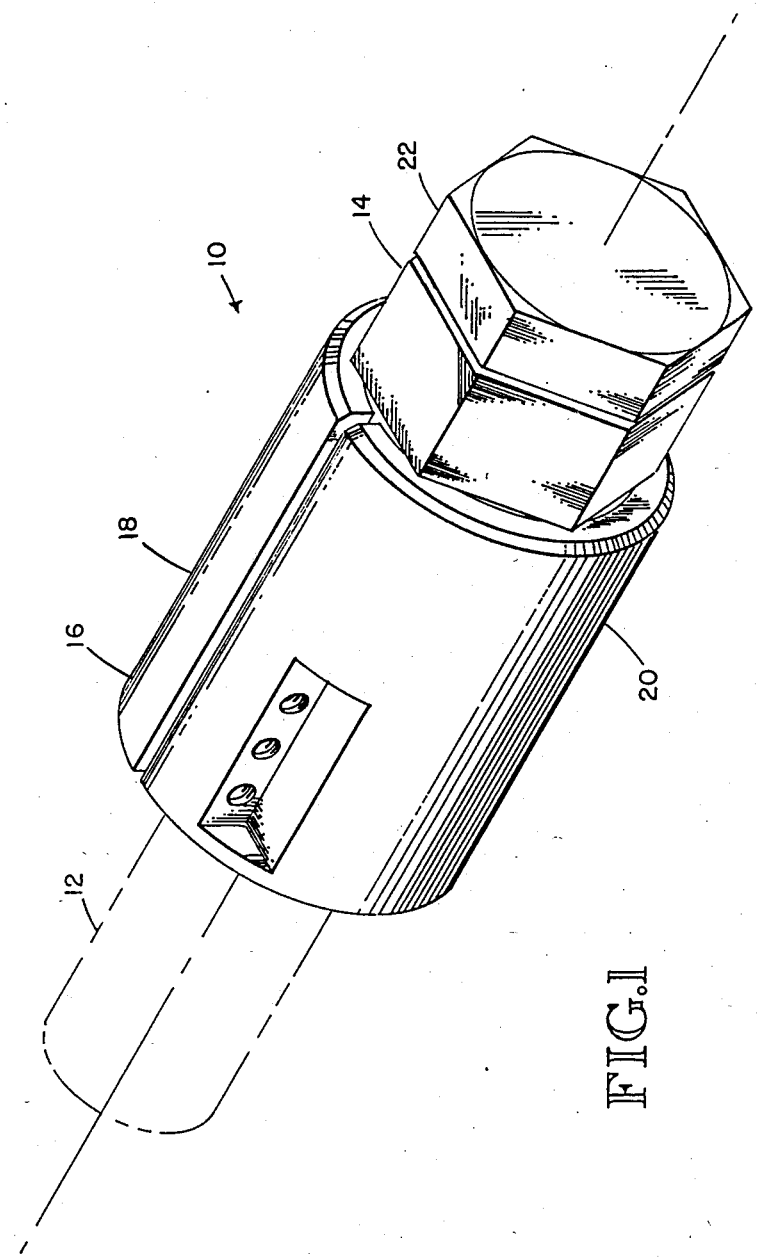
FIG. 1 is an isometric view of the fitting installed on the tubing.

The fitting, denoted generally as 10, shown in FIGS. 1 and 14, is placed on tubing 12. The fitting includes a sleeve 14 and a collar 16. The collar includes two members, 18 and 20. A plug 22 is threaded into sleeve 14 using a 90 durometer (Buna-N) O ring for a static seal.

Figure 2:
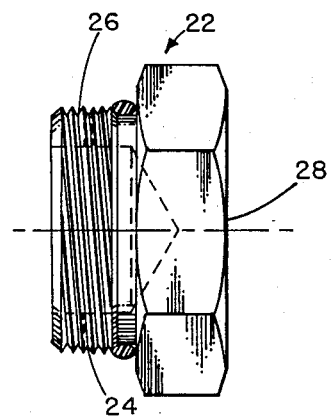
FIG. 2 is a side elevation of the end plug.

Plug 22 has pressure relief holes 24, shown in FIG. 2. These holes 24 provide a flow path from the interior of the plug to the outside to permit purging the tube. The pressure relief holes 24 are located in the threaded region 26 behind a first portion of threads but before the final thread portion. This permits the plug to be partially screwed into the sleeve and held by the threads while fluid is placed into the tube. Air escapes through holes 24 permitting complete purging of the tubing. When all air has been purged from the tube, the plug 22 is further tightened until plug 22 and sleeve 14 come into contact (metal to metal) and provide a static seal accomplished by the O ring between plug 22 and sleeve 14. The plug 22 may have internal threads and have a threaded opening 39 at end 28 to provide a fluid inlet that may be used for an autofrettage procedure, to attach a pressure gauge, etc.

The exterior of sleeve 14 has an hex shaped portion 40 and an annular portion 42 as shown in FIGS. 1 and 14. The hex portion permits the sleeve to be held by a wrench while plug 22 is secured therein. An annular recess 44 is provided in the exterior annular region for receiving a flange 46 of the collar assembly as shown in FIG. 3.

Figure 3:
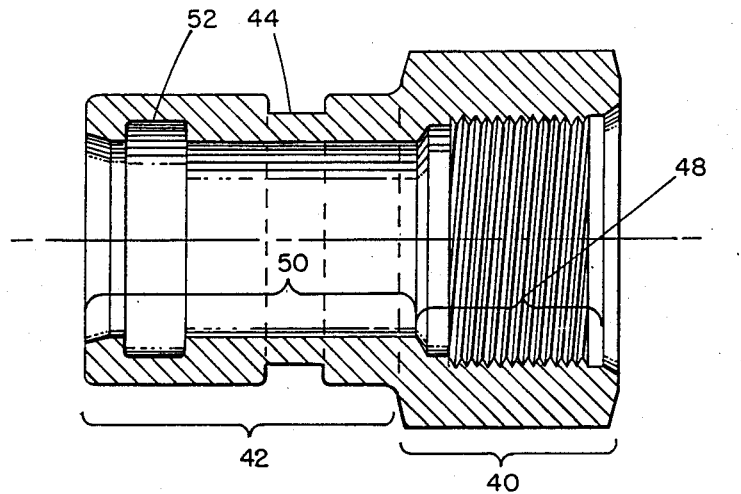
FIG. 3 is a cross-sectional view of the sleeve.
Figure 4:
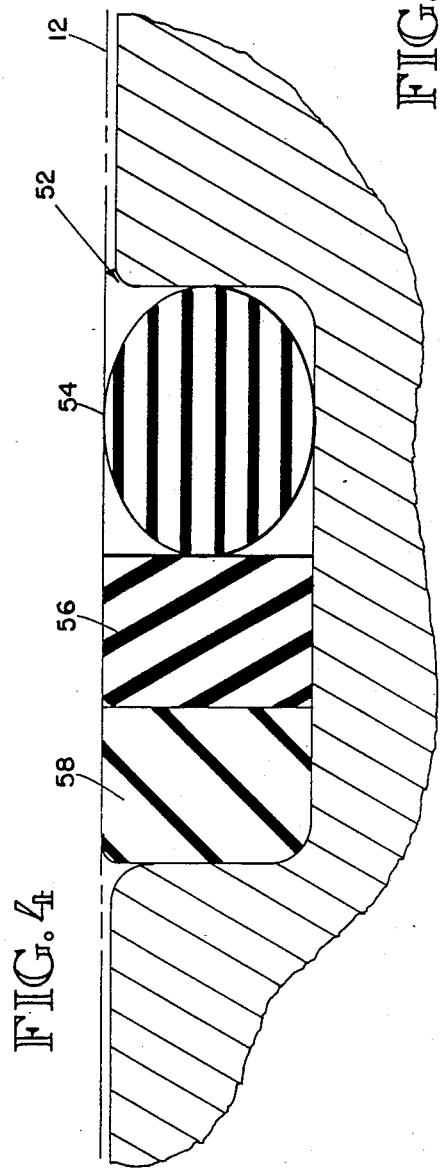
FIG. 4 is an enlarged cross-sectional view of the sealing rings within the sleeve.

The interior of sleeve 14 has a threaded region 48 for receiving the plug 22 and an annular region 50 for extending over the bare tubing as shown in FIG. 3. The annular region 50 is slightly larger in diameter than the external diameter of the tube to permit the sleeve to slide over the tube as shown in FIGS. 3 and 4. The annular region 50 includes an annular recess 52 for receiving a set of sealing rings.

The sealing rings include an O ring 54 and two backup rings 56 and 58. The O ring has an internal diameter less than the external diameter of tubing 12 so that the O ring firmly contacts the tubing, and is slightly compressed by the tubing. The O ring and the backup rings provide a fluid tight seal between the tubing and the sleeve at fluid pressures in excess of 24,000 psi. The set of sealing rings have been designed to withstand these pressures. The O ring is made from Nitrile of 90 durometers in hardness. The first backup ring is more dense and harder than the O ring. It is made from turcon-minimum moly 19 TM but other materials would work which are harder than the O ring. The second backup ring is more dense and harder than the first backup ring. It is made from Himod 552 TM but other materials which are harder and more dense than the first backup ring would also work. The two backup rings are scarf cut to permit removal and replacement. The different hardness and densities of the rings provides a seal capable of withstanding 24,000 psi. Previous seals have not been able to achieve this strength. The rings may be removed and replaced if they become worn in normal usage. The material for the seals may be obtained from the W.S. Shamban & Company Corporation, Sealing Division.

The metal sleeve itself, 14, does not contact the tubing, either at the end or along the external annular surface. The sleeve retains the sealing rings in firm contact with the tubing. The sleeve 14 has no internal shoulder stops abutting the tubing as is shown in FIGS. 3 and 11, and can be placed entirely over the tubing if desired. An alignment mark 114 on the tube guide aids in properly positioning the sleeve on the tubing as explained herein. The sleeve retains the plug 22 in a spared relationship away from the end of the tubing as shown in FIG. 14.

Figure 6:
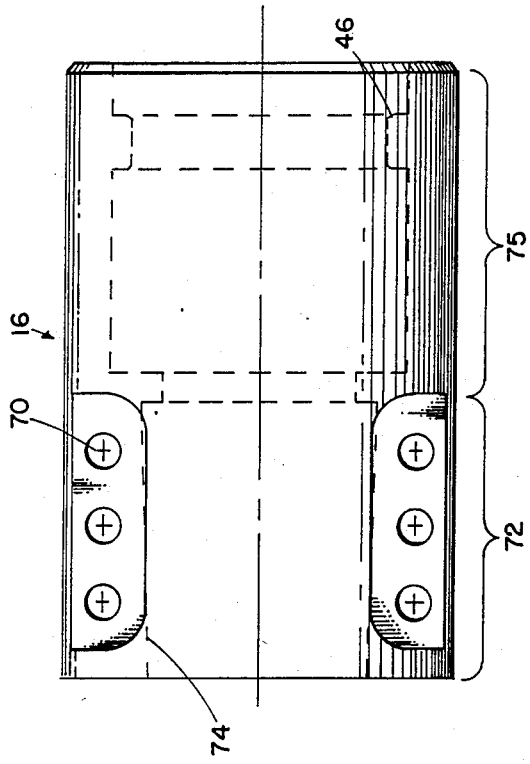
FIG. 6 is a side elevation of the collar assembly.
Figure 5:
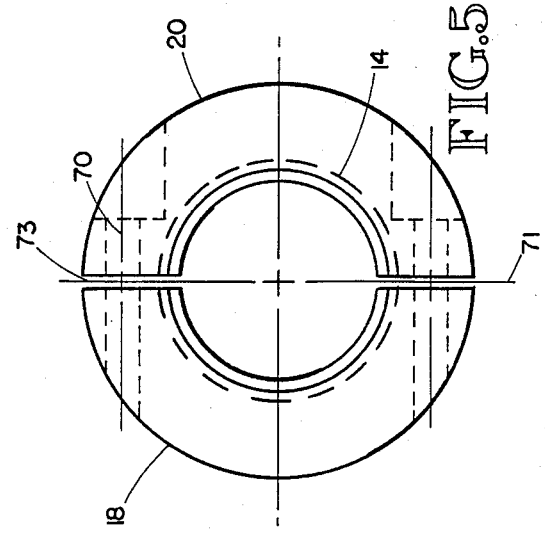
FIG. 5 is an end view of the collar assembly.

The collar assembly 16 includes two members, 18 and 20, having curved interior surfaces as shown in FIG. 5. The collar assembly has a restraining region 75 including an interior flange 46 as shown in FIGS. 6, 12 and 14. This annular flange 46 fits into recess 44 of the sleeve 14. The fit between the recess 44 and the flange 46 is not tight and permits the collar and sleeve to be rotated with respect to each other. Relative longitudinal movement is prevented, however. The two collar parts have respective holes 70, drilled and taped therein for connecting the two parts together with threaded fasteners such as bolts. The curved internal surfaces do not form a perfectly annular ring if placed together; rather, spaces 71 and 73 are provided as shown in FIG. 5, so that when the fasteners connect the parts together, force is applied to grip the tubing through the slip sleeves 76.

The collar assembly 16 includes a gripping region 72 having a tapered, interior, annular surface 74. The annular surface tapers inward at an angle of approximately 4 degrees included angle or 0.070 in/in taper on diameter but could taper at different angles, greater or less than this, if desired. A set of slip sleeves 76, including two sleeves 78 and 80, having tapered, external surfaces are shaped to mate with the interior surface 74 of the gripping region of the collar assembly. The slip sleeves have annular internal surfaces that are shaped to mate with the tubing and are not tapered. The respective slip sleeves are not perfect halves of an annular ring. When placed on the tubing, the slip sleeve set has openings 82 and 84, as shown in FIGS. 7 and 8. This permits firm gripping by the sleeves onto the tubing, when force is applied to the slip sleeves. This provides a firm friction fit between the tubing and the slip sleeve set.

The sleeve, collar and taper slip sleeve set provide an inherent self-locking feature. The fasteners holding the clamp in place should be torqued as specified by industry standards, however, so long as the fitting is secured to the tubing, such that it cannot be pulled off by hand, the fasteners will preload automatically when high pressure fluid is placed in the tubing.

For titanium alloy tubing the slip sleeve set is made of the same material as the tubing, that is, titanium alloy. This is an important feature to provide the friction fit and a fit that does not damage the tubing. When very high pressure fluid is introduced into the tubing 12 a tremendous force is applied between the tubing and the slip sleeve set. If steel or other metal is used for the slip sleeve set, the metal from the slip sleeve may impregnate the tubing. In the event a steel tube is being tested, the slip sleeves may be replaced with suitable steel slip sleeves, if desired. The slip sleeve and the tubing are preferably made of the same material, however, the collar halves must have enough slippage in order to provide tension in the bolts. That is, the coefficient of a static friction between the collar and the external slip sleeve must be lower than the coefficient of static friction between the internal slip sleeve and the outside diameter of the tubing. The slip sleeve set and collar should be selected to achieve this relationship.

A further advantage is achieved by using titanium sleeves with titanium tubing. The coefficient of static friction for titanium on titanium is much higher than that of steel on titanium. Use of titanium slip sleeves increases the holding force of the sleeves on titanium tubing. This also provides the advantage that the sleeves may be made very smooth but do not slip on the tubing during the test and hence will not cause galling or damage to the tubing due to slippage. Other material for the sleeves may be used if desired, such as stainless steel, particularly if the tubing is stainless steel or other material. The material for the sleeves should be selected to have a sufficiently high coefficient of friction with respect to the tubing and not place impurities in the tubing or otherwise damage the tubing.

A tube guide assembly, denoted generally as 90, is used when placing the sleeve onto the tube. The tube guide assembly includes a hollow cylinder portion 92, a collet rod 94, O rings 96 and a threaded knob 98. The hollow cylinder portion 92 is made of a tetrafluoroethylene, Teflon PTFE, or other material having a low coefficient of friction with respect to the O ring 54 and the backup rings. Alternatively, a metal or plastic tube coated with tetrafluoroethylene or other coating may be used. The cylinder 92 has a tapered region 100 that has a smaller external diameter than the internal diameter of O ring 54 of sleeve 14. The diameter at region 100 gradually decreases to be equal to or slightly greater than the external diameter of the tubing 12. The tube guide includes a middle portion 101 that is equal or slightly greater in diameter than the outer diameter at tube 12.

The cylinder 92 has a gripping region 102 that is smaller in diameter than the internal diameter of the tubing 12. It is inserted into the tube 2 as shown in FIG. 10. The gripping region has slots 104 that permits the cylinder to be expanded by the tapered collet rod. Two O rings 96 are around the cylinder in the gripping region to provide a firm fit between the tube guide assembly and the interior of the tubing. A shoulder region 106 between the gripping region and the main body of the cylinder has a diameter equal to or slightly greater than the external diameter of the tubing. This permits the gripping region of the tube guide assembly to be placed inside the tubing until the tubing abuts the shoulder region, the shoulder region acting as a stop.

The collet rod 94 extends through the hollow central region 108 of the cylinder. The collet rod 94 has a threaded portion 110 that mates with the internal threads of knob 98. The collet rod has an expanding tapering portion at the other en extending through the gripping region 102 of the cylinder. Turning the knob causes the collet rod to be drawn through the cylinder and expands the gripping region of the cylinder. The collet rod 94 has a square end 112 to permit holding the rod with a wrench while knob 98 is rotated.

An alignment mark 114 is provided at the appropriate position in the tube guide assembly for aid in placing the sleeve in the correct position on the tubing as explained herein.

The method of installing the fitting using the tube guide assembly is as follows. The gripping region 102 of the tube guide assembly 90 is placed inside the tubing 12. This is done prior to placing the sleeve and collar on the tubing as is shown in FIG. 10. The shoulder portion 106 abuts against the tubing end 107 as shown in FIG. 10. This places the alignment mark 114 an exact distance from the end of the tubing. The knob 98 is rotated to draw the collet rod through the knob, expanding the gripping region 102 and causing the O rings 96 to grip the interior of the tubing 12. The O rings 96 hold the tube guide assembly firmly in position on the tubing 12.

The assembly is now ready for placing sleeve 14 on the tubing 12. Before attachment of sleeve 14, a light coat of silicone O ring lubricant designed to meet MIL-G-4343 B, Amend 1 is applied. The sleeve 14 is placed over the knob 98 and the tapered end 100 of the tube guide assembly. When the sleeve is first placed over the tube guide, the sealing rings do not contact the tube guide because the tapered region 100 is smaller in diameter than the rings at the end of the tube guide. The sleeve 14 is moved along the tube guide towards the tubing 12. The sealing rings begin to contact the tube guide at the tapered region 100 as the sleeve is moved towards the tubing, the region in 100 having an increased diameter. The tapered region 100 provides a smooth surface that gradually expands to aid in expanding the sealing rings 54, 56 and 58 to the proper diameter. The sleeve 14 is moved along the tube guide towards the tubing, the guide acting to hold the sealing rings at the proper diameter prior to contacting the tubing. The sleeve continues to be moved at the tubing-guide assembly interface, 106 and 107, and is slid onto the tubing 12. The tube guide, at the shoulder region 106, is equal or slightly greater in diameter than the outer diameter of tubing 12. This provides a smooth transition onto the tubing. The sleeve is moved on the tubing until the alignment mark 114 extends just outside the sleeve as shown in FIG. 11. The sleeve is now in the proper position on the tube. The surface all around should be clean and dry before attaching the slip sleeve sets. The slip sleeve sets must also be clean and dry. MS 3–2 solvent or equal may be used. The two-part slip sleeve set 76 is placed on the tubing 12 spaced slightly from the end of the sleeve 14.

Figure 13:
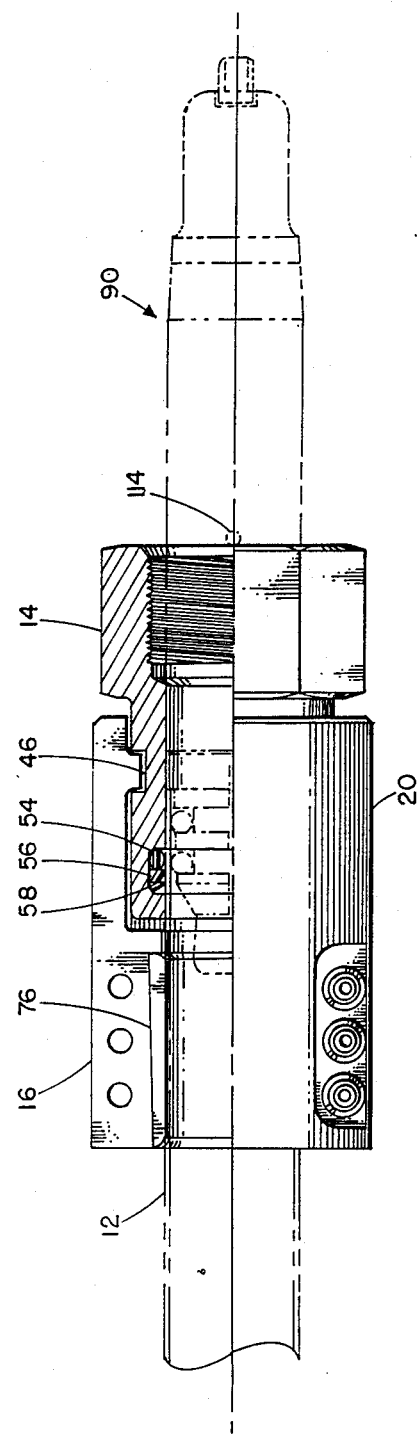
FIG. 13 is a partial cross sectional view of the tube guide assembly, sleeve and collar mounted on the tubing.

The two-part collar 18 is then placed on the tubing 12 surrounding the annular portion of the sleeve 14 and the slip sleeve set 76 as shown in FIG. 12. The fasteners in the collar are torqued to the proper industry standard to solidly hold the collar onto the tube through slip sleeves 76 as shown in FIG. 13. The flange 46 on the collar extends into the sleeve recesses 44 to solidly hold the sleeve on the end of the tube and prevent longitudinal movement of the sleeve with respect to the tubing.

The tube guide is removed by loosening the knob 98 and pushing the collet rod forward to permit the gripping portion to withdraw from firm contact with the interior of the tubing. The tube guide may be removed after the sleeve is placed on the tubing but prior to placing the collar on the sleeve if desired.

The tapered region 100 provides that the O ring is gradually expanded to the proper diameter. A smooth transition is provided between the shoulder region 106 and the tubing 12. The shoulder region is exactly the same diameter as the tubing, so the O ring slides from the tube guide onto the tubing with no additional stress being placed on the O ring. In one embodiment, the tube guide is slightly larger in diameter than the tubing so that the O ring is permitted to contract slightly as it moves onto the tubing. The bare end of the tubing is not exposed.

Use of the tube guide provides a significant number of advantages. Damage to the backup rings, O ring, and end of tubing 12 is minimized or completely eliminated. When used in the field the tubing 12 may have sharp and square edges at the bare end to be tested. Necessarily the sealing rings, such as O ring 54, are made of such a diameter as to contact the surface of the tubing. Without the use of the tube guide 90, if the O ring and backup rings are slid over the end of the tubing, the rings directly contact the rough or square end of the tubing causing gauging or damage to the rings. Such damaged rings will leak when high pressure is applied. The sleeve must then be removed and a new backup rings and O ring inserted. The new O ring may also be damaged during the slip-on procedure. This makes it difficult and time consuming to conduct the test.

In some circumstances, due to the square edges at the end of the tubing, the O ring and backup rings may not fit over the tubing. Because the sealing rings are designed to resist pressures in excess of 24,000 psi, when the rings contact the edge of the tubing, rather than slide over the tubing, they will abut against the edge and cannot be forced forward. This prevents the sleeve from being placed over the tube altogether. If the O ring/backup rings are made slightly larger to avoid this problem, the seal may not withstand the required pressure. The use of the tube guide with tapered end 100 solves this problem.

An additional problem is that the metal sleeve may bump the end of the bare tubing causing damage to the tubing. Even a small scratch or chip in the end may cause leaks. This creates a problem because the tubing must be used after the test is completed. Damage to the end requires that the end be cut off making the tube a few inches shorter. If the tubing is installed in the hydraulic system in an aircraft, this may not be possible without changing other parts of the system. When using the tube guide assembly, the bare end of the tubing abuts the shoulder region of the tube guide and is not exposed. The end of the tubing is protected by the tube guide so that the tubing end is not damaged by the sleeve or other tools when installing the fitting.

Additional advantages are provided by use of the tube guide assembly. The inside of the tubing is kept clean and free of foreign material. It is important that grease, dirt and other foreign objects not be placed in the tubing. The tube guide seals the tubing to keep foreign material out of the tubing while the sleeve and collar are being attached. Further, the O rings 96 are made of a rubber material that will not damage, mar or leave impurities on the inside of tubing 12. This is particularly important for titanium tubing or if hydraulic fluid is being placed in the tubing and the fluid is required to be extremely clean.

The tube guide assembly provides proper alignment of the sleeve with the tubing as shown in FIG. 11. As can be seen from FIGS. 3 and 11, the sleeve 14 has no internal shoulder or stop point for the end of the tubing. This helps prevent damage to the end of the tubing. The alignment mark on the tube guide is provided in a fixed relationship with respect to the shoulder region 106 at a particular location to permit correct alignment of the sleeve on the tubing and proper spacing from the end of the tubing. The sleeve is positively located with respect to the end of the tubing 12. The operator can be certain that the sleeve is on the tubing and not on the tube guide by use of mark 114.

A plug 22, or other fitting is then threaded into sleeve 14. The sleeve extends outward from the tubing sufficiently far to prevent contact with the end of the tubing when a fitting is attached. During a test, fluid enters the sleeve in volume 45. This permits coupling to the fluid through sleeve 14 without contacting tubing 12 during a test. The fluid may be coupled through optionally provided channels 39 in the plug 22 or channels 41 in the sleeve 14 if necessary, such as, for attaching instruments, inserting a test fluid, etc.

After the tube guide has been removed and the plug 22 or other end fitting is in place, fluid under high pressure is placed in the tubing. Bleed holes 24 may be used to permit air to exit from the tubing prior to engaging plug 22.

With the fluid under high pressure in the tubing, a force is exerted on the sleeve tending to push it off the end of the tubing. This force is in a longitudinal direction. As the force acts on the sleeve the sleeve moves slightly and pulls the collar towards the end of the tubing. As the collar moves slightly, the tapered slip sleeve set is forced inward with greater pressure against the tubing, because of the tapered relationship to the collar. This causes the sleeves to tightly grip the tubing and causes the collar to stop sliding. The shear force on the sleeve and collar is transferred, at least partially into compression on the slip sleeve set 76 and into tension in the fasteners. The greater the longitudinal force acting on the collar, the greater the inward pressure exerted by the collar on the sleeves because of the tapered surface between the sleeves and the collar. Even when very high pressures, e.g., in excess of 24,000 psi are applied, the collar holds the sleeve firmly in place with no movement, slippage or leaking.

The slip sleeves are designed to not move with respect to the tubing. When longitudinal force is applied, as by fluid pressure, the collar moves with respect to the sleeves prior to the sleeves moving with respect to the tubing. This is because the coefficient of friction between the collar and the sleeves is less than between the sleeves and the tubing. This presses the sleeves tighter against the tubing, further preventing movement of the sleeves. This ensures that the slip sleeves do not move with respect to the tubing. The collar set can not move further towards the end of the tubing due to the taper. The interior surface slip sleeves are very smooth and are curved to mate with the tubing. The contact area is thus relatively large to provide a greater area over which the retaining friction may act. Because the slip sleeves do not move and because of the smooth relationship the slip sleeves to the tubing 12, the slip sleeves do not mar or bite into the tubing when providing the clamping actions.

At the conclusion of the high pressure test or autofrettage procedure, the pressure is reduced and the collar and sleeve are removed from the tubing. A particular advantage of this sleeve and collar assembly is that the end of the tubing is not marred, galled or damaged. The edge is not contacted by any part of the fitting and, thus, it is also undamaged. This is an important advantage when testing hydraulic systems in place in an aircraft. Other prior art devices often leave scratches near the end of the tubing or mar the edges so that the tubing is not suitable to provide a fluid seal when reconnected to the hydraulic system. Damage to the exterior surface near the end of the tubing is prevented by not contacting the tubing with a gripping force near the end of the tubing. The O ring contacts the tubing and provides the seal. The O ring is a rubber that will not mar the tubing. The gripping action provided by the collar is spaced apart from the O ring and in a direction away from the end of the tubing. Damage from the slip sleeve set is not likely for the reasons previously discussed herein. Even if damage is caused by the slip sleeve set in the collar this damage is spaced from the end of the tubing and will not interfere with an hydraulic seal at the end of the tubing. Some industry standard hydraulic system fittings require that the end section of the tubing have a high degree of smoothness and be free of all mars and defects. Such a hydraulic system connection is possible on tubing after being tested by this sleeve and collar assembly.

While this invention and method of use have been described with respect to particular figures and materials, equivalent structures and methods fall within the scope of this invention.

I claim:

1. A test fitting for an annular tubing comprising: means for subjecting the tubing to a fluid pressure, an annular sleeve having an interior surface and an exterior surface, said interior surface having a diameter slightly larger than an external diameter of said tubing, said sleeve having an interior annular recess in said interior surface having an O ring and backup rings therein for contacting said tubing to provide a fluid seal between said tubing and said sleeve, said sleeve having an exterior annular recess in said exterior surface;

a collar assembly including two collar members being held together by fasteners, said collar assembly having a restraining portion and a gripping portion, said restraining portion enclosing a portion of said sleeve and having flanges extending into said exterior annular recess in said sleeve for holding said sleeve onto said tubing, said gripping portion including a tapered interior surface region;

two tapered sleeves being tapered at an exterior surface and of uniform curvature at an interior surface having the exterior surface in mating contact with said gripping portion of said collar assembly and said interior surface being in contact with said tubing such that shear force between said tapered sleeves and said tube is transferred, at least partially, into inward compression force on said tapered sleeves.

2. The fitting according to claim 1 wherein said means for subjecting the tubing to a fluid pressure includes a plug having a threaded portion and having pressure relief holes in said threaded portion for providing venting of said tubing to an outside volume prior to fully engaging all of said threaded portion in said sleeve and providing a fluid tight seal when said plug threaded portion is fully engaged into said sleeve.

3. The fitting according to claim 1 wherein said tapered sleeves are made of the same material as said tubing to prevent impregnating said tubing with impurities.

4. The fitting according to claim 3 wherein said tapered sleeves and said tubing both include titanium metal.

5. The fitting according to claim 1 wherein said gripping portion is spaced from an end of said tubing by a distance greater than said external diameter of said tube to ensure that said end is not marred by said test fitting.

6. The apparatus according to claim 1 wherein said gripping portion is spaced from an end that is closest to said sleeve by a distance sufficiently great that a cryofit fitting coupled to said tubing does not contact said gripping portion.

7. The fitting according to claim 1 wherein said sleeve extends over an end of said tubing such that a portion of said sleeve surrounds said tubing and a portion of said sleeve extends beyond said tubing.

8. The fitting according to claim 1 wherein said O ring has a predetermined density and hardness and said backup rings include a first backup ring having a hardness greater than said O ring and a second backup ring having a hardness greater than said hardness of said first backup ring.

9. The fitting according to claim 1 wherein rotational movement of said sleeve is permitted with respect to said collar assembly but longitudinal movement is restrained.

10. The fitting according to claim 1 wherein a coefficient of static friction between said tapered sleeves and said tube is greater than a coefficient of static friction between said tapered sleeves and said collar assembly.

* * * * *